(12) United States Patent
Chatterjee et al.

(10) Patent No.: US 11,140,710 B2
(45) Date of Patent: Oct. 5, 2021

(54) SIGNAL DESIGNS FOR D2D SUBFRAMES

(71) Applicant: Apple Inc., Cupertino, CA (US)

(72) Inventors: Debdeep Chatterjee, San Jose, CA (US); Seunghee Han, San Jose, CA (US); Gang Xiong, Portland, OR (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/408,378

(22) Filed: May 9, 2019

(65) Prior Publication Data

US 2019/0373632 A1    Dec. 5, 2019

Related U.S. Application Data

(63) Continuation of application No. 15/492,844, filed on Apr. 20, 2017, now Pat. No. 10,375,727, which is a
(Continued)

(51) Int. Cl.
*H04W 74/04*    (2009.01)
*H04L 1/00*    (2006.01)
(Continued)

(52) U.S. Cl.
CPC .......... *H04W 74/04* (2013.01); *H04B 7/2621* (2013.01); *H04L 1/0026* (2013.01);
(Continued)

(58) Field of Classification Search
CPC ............... H04W 16/14; H04W 56/001; H04W 72/1215; H04W 36/0069; H04W 74/04;
(Continued)

(56) References Cited

U.S. PATENT DOCUMENTS 9,681,487 B2    6/2017 Chatterjee et al.
9,900,084 B2 *  2/2018 Ahn .................. H04W 56/0005
(Continued)

FOREIGN PATENT DOCUMENTS

CA        2869000        10/2013
JP    2010516201 A        5/2010
(Continued)

OTHER PUBLICATIONS

International Preliminary Report on Patentability in International Appln. No. PCT/US2014/064430, dated May 31, 2016, 9 pages.
(Continued)

*Primary Examiner* — Melanie Jagannathan
(74) *Attorney, Agent, or Firm* — Fish & Richardson P.C.

(57) ABSTRACT

Embodiments of the present disclosure describe apparatuses and methods for signal designs for device-to-device (D2D) subframes. Various embodiments may include a UE with a radio transceiver to communicate with another UE via D2D communications. The UE may further include processing circuitry to generate a cyclic prefix (CP) for a first or second symbol of a D2D subframe at an orthogonal frequency division multiplexing (OFDM) resource block or a single-carrier frequency-division multiple access (SC-FDMA) resource block. Other embodiments may be described and/or claimed.

20 Claims, 13 Drawing Sheets

Related U.S. Application Data continuation of application No. 14/498,276, filed on Sep. 26, 2014, now Pat. No. 9,681,487.

(60) Provisional application No. 61/909,938, filed on Nov. 27, 2013.

(51) Int. Cl.
| | | |
|---|---|---|
| *H04L 29/08* | (2006.01) | |
| *H04L 29/06* | (2006.01) | |
| *H04W 36/00* | (2009.01) | |
| *H04L 5/00* | (2006.01) | |
| *H04L 5/14* | (2006.01) | |
| *H04W 72/04* | (2009.01) | |
| *H04W 52/02* | (2009.01) | |
| *H04L 1/18* | (2006.01) | |
| *H04W 40/30* | (2009.01) | |
| *H04L 12/825* | (2013.01) | |
| *H04W 28/02* | (2009.01) | |
| *H04W 16/14* | (2009.01) | |
| *H04B 7/26* | (2006.01) | |
| *H04L 27/26* | (2006.01) | |
| *H04W 72/02* | (2009.01) | |
| *H04W 76/28* | (2018.01) | |
| *H04W 76/27* | (2018.01) | |
| *H04W 80/06* | (2009.01) | |
| *H04W 88/06* | (2009.01) | |
| *H04W 88/10* | (2009.01) | |
| *H04W 84/12* | (2009.01) | |

(52) U.S. Cl.
CPC .......... *H04L 1/1825* (2013.01); *H04L 5/0007* (2013.01); *H04L 5/0032* (2013.01); *H04L 5/0051* (2013.01); *H04L 5/0073* (2013.01); *H04L 5/14* (2013.01); *H04L 27/2607* (2013.01); *H04L 47/25* (2013.01); *H04L 69/161* (2013.01); *H04L 69/163* (2013.01); *H04L 69/321* (2013.01); *H04L 69/324* (2013.01); *H04L 69/326* (2013.01); *H04W 16/14* (2013.01); *H04W 28/0205* (2013.01); *H04W 36/0069* (2018.08); *H04W 40/30* (2013.01); *H04W 52/0216* (2013.01); *H04W 52/0254* (2013.01); *H04W 72/02* (2013.01); *H04W 72/042* (2013.01); *H04W 72/048* (2013.01); *H04W 72/0413* (2013.01); *H04W 72/0446* (2013.01); *H04W 72/0453* (2013.01); *H04W 76/27* (2018.02); *H04W 76/28* (2018.02); *H04W 80/06* (2013.01); *H04W 84/12* (2013.01); *H04W 88/06* (2013.01); *H04W 88/10* (2013.01); *Y02D 30/50* (2020.08); *Y02D 30/70* (2020.08)

(58) Field of Classification Search
CPC .... H04W 76/28; H04W 76/27; H04B 7/2621; H04L 1/0026; H04L 1/1825; H04L 5/0007

See application file for complete search history.

(56) References Cited

U.S. PATENT DOCUMENTS

| | | | |
|---|---|---|---|
| 10,375,727 | B2 | 8/2019 | Chatterjee et al. |
| 2007/0211667 | A1* | 9/2007 | Agrawal ................. H04L 5/023 370/335 |
| 2010/0093364 | A1 | 4/2010 | Ribeiro et al. |
| 2011/0080896 | A1* | 4/2011 | Krishnamurthy ........................... H04W 72/0406 370/336 |
| 2012/0281551 | A1* | 11/2012 | Alanara .............. H04L 27/2607 370/252 |
| 2013/0258935 | A1* | 10/2013 | Zhang ................... H04L 12/189 370/312 |
| 2013/0265992 | A1* | 10/2013 | Deng .................. H04W 56/001 370/336 |
| 2013/0272262 | A1* | 10/2013 | Li .......................... H04L 5/0064 370/330 |
| 2013/0279435 | A1* | 10/2013 | Dinan ................. H04L 61/6022 370/329 |
| 2013/0315152 | A1* | 11/2013 | Ratasuk ................ H04W 76/14 370/329 |
| 2013/0315214 | A1* | 11/2013 | Bai ......................... H04L 5/001 370/336 |
| 2013/0336302 | A1* | 12/2013 | Lee ...................... H04L 5/0096 370/336 |
| 2014/0086161 | A1* | 3/2014 | Cai ..................... H04W 72/042 370/329 |
| 2015/0016428 | A1* | 1/2015 | Narasimha ........ H04W 72/1215 370/336 |
| 2015/0031410 | A1* | 1/2015 | Lim .................... H04W 52/244 455/522 |
| 2015/0146647 | A1 | 5/2015 | Chatterjee et al. |
| 2015/0289141 | A1* | 10/2015 | Ghasemzadeh ....... H04W 16/14 370/330 |
| 2015/0334704 | A1* | 11/2015 | Wei .................... H04W 72/0446 370/294 |
| 2015/0341150 | A1* | 11/2015 | Seo ...................... H04W 72/048 370/336 |
| 2016/0007371 | A1* | 1/2016 | Pietraski ........... H04W 72/1289 370/315 |
| 2016/0219612 | A1* | 7/2016 | Seo ........................ H04L 69/22 |
| 2017/0231006 | A1* | 8/2017 | Yin .................... H04W 72/0446 |
| 2017/0273106 | A1 | 9/2017 | Chatterjee et al. |
| 2020/0314891 | A1* | 10/2020 | Li ........................ H04W 16/14 |

FOREIGN PATENT DOCUMENTS

| | | |
|---|---|---|
| RU | 118142 | 7/2012 |
| WO | WO 2013008065 | 1/2013 |
| WO | 2013116237 A1 | 8/2013 |
| WO | WO 2013/122431 A1 | 8/2013 |
| WO | 2013/141647 A1 | 9/2013 |
| WO | WO 2013/137639 A1 | 9/2013 |

OTHER PUBLICATIONS

European Patent Office—Article 94(3) dated Aug. 29, 2019 from European Patent Application No. 14866769.44, 4 pages.

Xiong et al., "Systems, Methods, and Devices for Device-To-Device Discovery," U.S. Appl. No. 14/316,156, filed Jun. 26, 2014, 53 pages.

International Search Report and Written Opinion dated Feb. 16, 2015 from International Application No. PCT/US2014/064430.

3GPP TS 36.211 V10.7.0 (Feb. 2013); "3rd Generation Partnership Project; Technical Specification Group Radio Access Network; Evolved Universal Terrestrial Radio Access (E-UTRA); Physical Channels and Modulation (Release 10)," (Feb. 2013); 101 pages.

Office Action issued for Russian Patent Application No. 2016116704 dated Mar. 9, 2017; 10 pages.

Japanese Patent Office, First Office Action for Japanese App. No. 2016-534213 dated Apr. 25, 2017; 11 pages.

Ericsson; "Physical Channels design for D2D," 3GPP TSG RAN WG1 Meeting #75, R1-135806, Agenda Item: 6.2.8.2.1; San Francisco, USA, Nov. 11-15, 2013; 8 pages.

ETRI; "On the D2DSS and PD2DSCH," 3GPP TSG-RAN1 Meeting #75, R1-135277, Agenda Item: 6.2.8.1.1; San Francisco, USA, Nov. 11-15, 2013; 8 pages.

LG Electronics; "Synchronization for D2D communications," 3GPP TSG RAN WG1 Meeting #74 R1-133384, Agenda item: 7.2.8.1; Barcelona, Spain, Aug. 19-23, 2013; 11 pages.

LG Electronics; "D2D Communication Signal Format," 3GPP TSG RAN WG1 Meeting #74bis R1-134411, Agenda item: 7.2.8.1.2; Guangzhou, China, Oct. 7-11, 2013; 8 pages.

(56) References Cited

OTHER PUBLICATIONS

Samsung; "Discussion on D2D Group Communication," 3GPP TSG RAN WG1 Meeting #74 R1-133117, Agenda item: 7.2.8.1; Barcelona, Spain, Aug. 19-23, 2013; 5 pages.
3GPP TS 36.211 V11.4.0 (Sep. 2013); "Technical Specification Group Radio Access Network; Evolved Universal Terrestrial Radio Access (E-UTRA); Physical channels and modulation (Release 11)," 120 pages.
Australian Government; Office Action issued for Patent Application No. 2014355101 dated Feb. 8, 2017; 6 pages.
Korean Patent Office; Office Action issued for Patent Application No. 2016-7010977 dated Jun. 29, 2017; 17 pages.
European Patent Office; Partial Supplementary European Search Report dated Jul. 28, 2017 for Patent Application No. 14866769.4; 17 pages.
LG Electronics; "D2D Communication Signal Format," 3GPP TSG RAN WG1 Meeting #74bis, R1-134800; Agenda Item: 7.2.8.1.2; Guangzhou, China, Oct. 7-11, 2013; 9 pages.
LG Electronics; "D2D Discovery Signal Format," 3GPP TSG RAN WG1 Meeting #74bis, R1-134415; Agenda Item: 7.2.8.2.1; Guangzhou, China, Oct. 7-11, 2013; 8 pages.
Examination Report dated Oct. 17, 2017 from Australian Patent Application No. 2014355101, 4 pages.
Extended European Search Report dated Nov. 7, 2017 from European Patent Application No. 14866769.4, 13 pages.
Decision to Refuse dated Dec. 19, 2017 from Japanese Patent Application No. 2016-534213, 5 pages.
Examination Report dated Jan. 19, 2018 from Australian Patent Application No. 2014355101, 4 pages.
Korean Patent Office—Notice of Final Rejection dated Mar. 26, 2018 from Korean Patent Application No. 2016-7010977, 6 pages.
European Patent Office—Article 94(3) dated Jul. 31, 2018 from European Patent Application No. 14 866 769.4 , 4 pages.
LG Electronics, "D2D Discovery Signal Format," 3GPP TSG RAN WG1 Meeting #75, R1-135484, Agenda item: 6.2.8.2.1, Nov. 11-15, 2013, San Francisco, USA, 6 pages.
European Patent Office—Article 94(3) dated Jan. 15, 2019 from European Patent Application No. 14 866 769.4 , 4 pages.
3GPP TS 36.213, "3rd Generation Partnership Project; Technical Specification Group Radio Access Network; Evolved Universal Terrestrial Radio Access (E-UTRA); Physical layer procedures (Release 11)," Sep. 2013, 162 pages.
EP Extended European Search Report in European Appln. No. 20217432.2, dated Mar. 24, 2021, 9 pages.

* cited by examiner

SIGNAL DESIGNS FOR D2D SUBFRAMES

CROSS REFERENCE TO RELATED APPLICATION

This application is a continuation of U.S. patent application Ser. No. 15/492,844, filed Apr. 20, 2017, entitled "SIGNAL DESIGNS FOR D2D SUBFRAMES," which is a continuation of U.S. patent application Ser. No. 14/498,276, filed Sep. 26, 2014, entitled "SIGNAL DESIGNS FOR D2D SUBFRAMES," which claims priority to U.S. Provisional Patent Application No. 61/909,938, filed Nov. 27, 2013, entitled "ADVANCED WIRELESS COMMUNICATION SYSTEMS AND TECHNIQUES," disclosures of which are hereby incorporated by reference in their entireties.

FIELD

Embodiments of the present disclosure generally relate to the field of wireless communication, and more particularly, to apparatuses and methods for signal designs for device-to-device (D2D) subframes.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

D2D applications may provide a scalable and universal framework for connecting proximity peers. There are different technology solutions for D2D applications, e.g., based on WiFi Direct or Near Field Communication (NFC) technology. A special solution that relates to the 3rd Generation Partnership Project (3GPP) is Proximity Services (ProSe) as well as Long-Term Evolution (LTE) Direct.

Support of LTE-based D2D discovery and communications is being studied by the 3GPP radio access network (RAN) working groups (WG). In this regard, it was agreed by the RAN1 WG that D2D discovery and communications within network coverage may be supported on the uplink (UL) spectrum in frequency-division duplexing (FDD) systems, and on UL subframes or potentially downlink (DL) subframes as well for time-division duplexing (TDD) systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe apparatuses and methods for signal designs for device-to-device (D2D) subframes. Various embodiments may include a UE with a radio transceiver to communicate with another UE via D2D communications. The UE may further include processing circuitry to generate a cyclic prefix (CP) with a length greater than 33.33 microseconds for a first or second symbol of a D2D subframe. These and other aspects of the present disclosure will be more fully described below.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
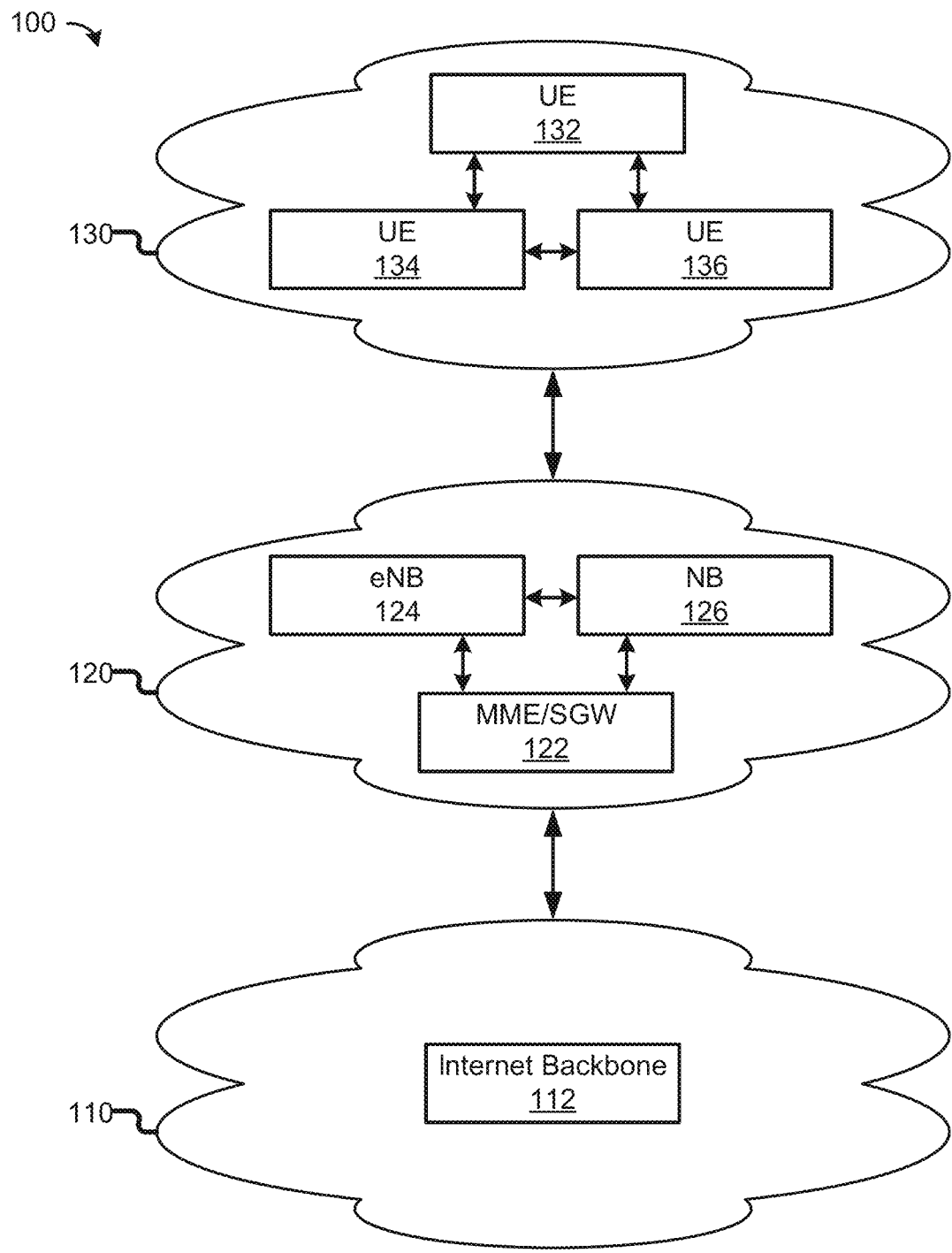
FIG. 1 schematically illustrates a wireless communication system in accordance with various embodiments.

FIG. 1 schematically illustrates a wireless communication system 100 in accordance with various embodiments. The wireless communication system 100 may include a backbone network 110, a core/access network 120, and a D2D network 130.

The backbone network 110 may be a part of computer network infrastructure that interconnects various sub-networks and provides a path for the exchange of information between these sub-networks. In various embodiments, the backbone network 110 may include Internet backbone 112, which may include the principal data routes between large, strategically interconnected computer networks and core routers on the Internet.

The core/access network 120 may be connected to the backbone network 110. In various embodiments, the core/access network 120 may include one or more radio access networks, such as a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. In some embodiments, a radio access network may include GSM Enhanced Data rates for GSM Evolution (EDGE) Radio Access Network (GERAN), Universal Terrestrial Radio Access Network (UTRAN), or Evolved UTRAN (E-UTRAN). The core/access network 120 may operate in accordance with other network technologies in other embodiments.

Mobile communication technology may rely on various standards and protocols to transmit data between a base station and a wireless communication device. Wireless communication system standards and protocols may include, for example, the 3GPP LTE; the Institute of Electrical and Electronics Engineers (IEEE) 802.16 standard, which is commonly known to industry groups as worldwide interoperability for microwave access (WiMAX); and the IEEE 802.11 standard, which is commonly known as Wi-Fi. In a 3GPP radio access network (RAN), according to LTE, the base station may be referred to as an evolved Node B (also commonly denoted as eNodeB, or eNB). It may communicate with a wireless communication device, known as user equipment (UE). Although the present disclosure is presented with terminology and examples generally directed toward 3GPP systems and standards, the teaching disclosed herein may be applied to any type of wireless network or communication standard.

In various embodiments, the core/access network 120 may include eNB 124, NB 126, and mobility management entities (MME) and serving gateways (SGW) 122. eNB 124 may be more intelligent than legacy NB 126, which may be used in a 3G network such as a UMTS network. For example, radio network controller (RNC) functionality may be located in eNB 124 rather than being in a separate RNC entity. In LTE, eNB 124 may connect to another eNB, e.g., via an X2 interface, to forward or share information. In some embodiments, the core/access network 120 may be an Internet Protocol (IP) based network, wherein interfaces between network entities (e.g., eNB 124 and MME/SGW 122) may be based on IP. In some embodiments, MME/SGW 122 may communicate with eNB 124, e.g., over an S1 interface. The S1 interface may be similar to the S1 interface as defined in 3GPP TS 36.410 V11.1.0 (2013-09) and may support a many-to-many relation between MME/SGW 122 and eNB 124. For example, different operators may simultaneously operate the same eNB in a network sharing setting. In some embodiments, communication between the eNB 124 and UEs may be facilitated via the MME/SGW 122. The MME/SGW 122 may be configured to manage signaling exchanges, e.g., authentication of the UE 132, or perform other actions associated with establishment of a communication link between the UE 132 and the core/access network 120. In some embodiments, the MME/SGW 122 may be responsible for tracking and paging user equipment, e.g., when the UE 132 is in an idle mode.

For ease of illustration, various descriptions herein are provided to conform to 3GPP in the communication system 100; however, the subject matter of the present disclosure is not limited in this regard and the embodiments disclosed herein may be advantageously applied to other wired or wireless communication protocols or networks. For example, in an embodiment in which the core/access network 120 includes a UTRAN, the NB 126 may take the form of an RNC, which may be configured to communicate with the UEs 132, 134, or 136. In an embodiment where the core/access network 120 includes a GERAN, the eNB 124 may represent a base station controller (BSC) configured to communicate with the UEs 132, 134, or 136 via a base transmission station (BTS).

In various embodiments, the UE 132 may access the core/access network 120 via a radio link with a base station, e.g., eNB 124. A downlink (DL) transmission may be a communication from the eNB 124 to the UE 132. An uplink (UL) transmission may be a communication from the UE 132 to the eNB 124. Only limited numbers of UEs and eNBs are illustrated in FIG. 1 for ease of illustration. However, the communication system 100 may include any number of UEs, eNBs, or other servers while practicing suitable embodiments of the present disclosure. As an example, in some embodiments, the core/access network 120 may also include other servers, such as a machine type communication (MTC) server (not shown) to facilitate MTC.

In some embodiments, the UE 134 may be configured to communicate with another machine using MTC technology. The term MTC, as discussed above, refers to data transmitted to or from user equipment to another machine with little or no human interaction. For example, the UE 134 may be a sensor that is electrically coupled to a wireless transceiver (e.g., the transceiver circuitry 224, discussed below with reference to FIG. 2), and may be configured to communicate, with little or no intervention, with another machine enabled for MTC. In some embodiments, the wireless transceiver of the UE 134 may also be configured to communicate with at least one of a wireless metropolitan area network (WMAN), a wireless local area network (WLAN), or a wireless personal area network (WPAN).

In some embodiments, the UE 136 may be a mobile communication device, a subscriber station, or another device that is configured to communicate with the core/access network 120, e.g., via the eNB 124, in conformance with an appropriate protocol (e.g., a multiple-input/multiple-output (MIMO) communication scheme).

In various embodiments, UE 132, UE 134, and UE 136 may form a D2D network 130. In the D2D network 130, two UEs in proximity may directly communicate with each other without the assistance of eNB 124 or any other base stations and core networks. Direct communication between devices is commonly known as device-to-device (D2D) communication or peer-to-peer (P2P) communication.

As discussed in further detail below, the UEs, 132, 134, and/or 136 may be configured for using specially designed subframes for D2D communications. Such subframes may enable the UEs 132, 134, or 136 to accommodate the transmit-to-receive or receive-to-transmit (hereinafter, "Tx/Rx") switching time needed in D2D communications. Further, such subframes may enable the UEs 132, 134, or 136 to handle the automatic gain control (AGC) setting time in D2D communications.

D2D communication in the D2D network 130 may be non-transparent to the core/access network 120 and may occur on a cellular spectrum (e.g., inband) or unlicensed spectrum (e.g., outband). D2D communication in the D2D network 130 may be realized in different communication technologies. In some embodiments, short-range technologies, such as Bluetooth or Wi-Fi, may be used. In some embodiments, D2D communication may reuse licensed LTE spectrum or unlicensed LTE spectrum.

In various embodiments, D2D communication in the D2D network 130 may first include device discovery, whereby UEs are to determine whether they are within range and/or available for D2D communication before establishing a D2D session. Proximity detection may be assisted by the core/access network 120, may be performed at least partially by UEs, or may be performed largely by UEs independently. In various embodiments, D2D discovery may be restricted (also known as closed D2D discovery) or open (also known as promiscuous D2D discovery).

In various embodiments, D2D communication in the D2D network 130 may improve spectrum utilization, increase network throughput, reduce transmission delay, offload traffic for eNB 124, and alleviate congestion in the core/access network 120. In this regard, D2D communications may have a wide variety of applications. For example, D2D network 130 may be used for local social networks, content sharing, location-based marketing, service advertisements, mobile-to-mobile applications, etc. Enhanced by the teachings in this disclosure, the D2D network 130 may become a fallback public safety network that may function even when the core/access network 120 becomes unavailable or fails.

Figure 2:
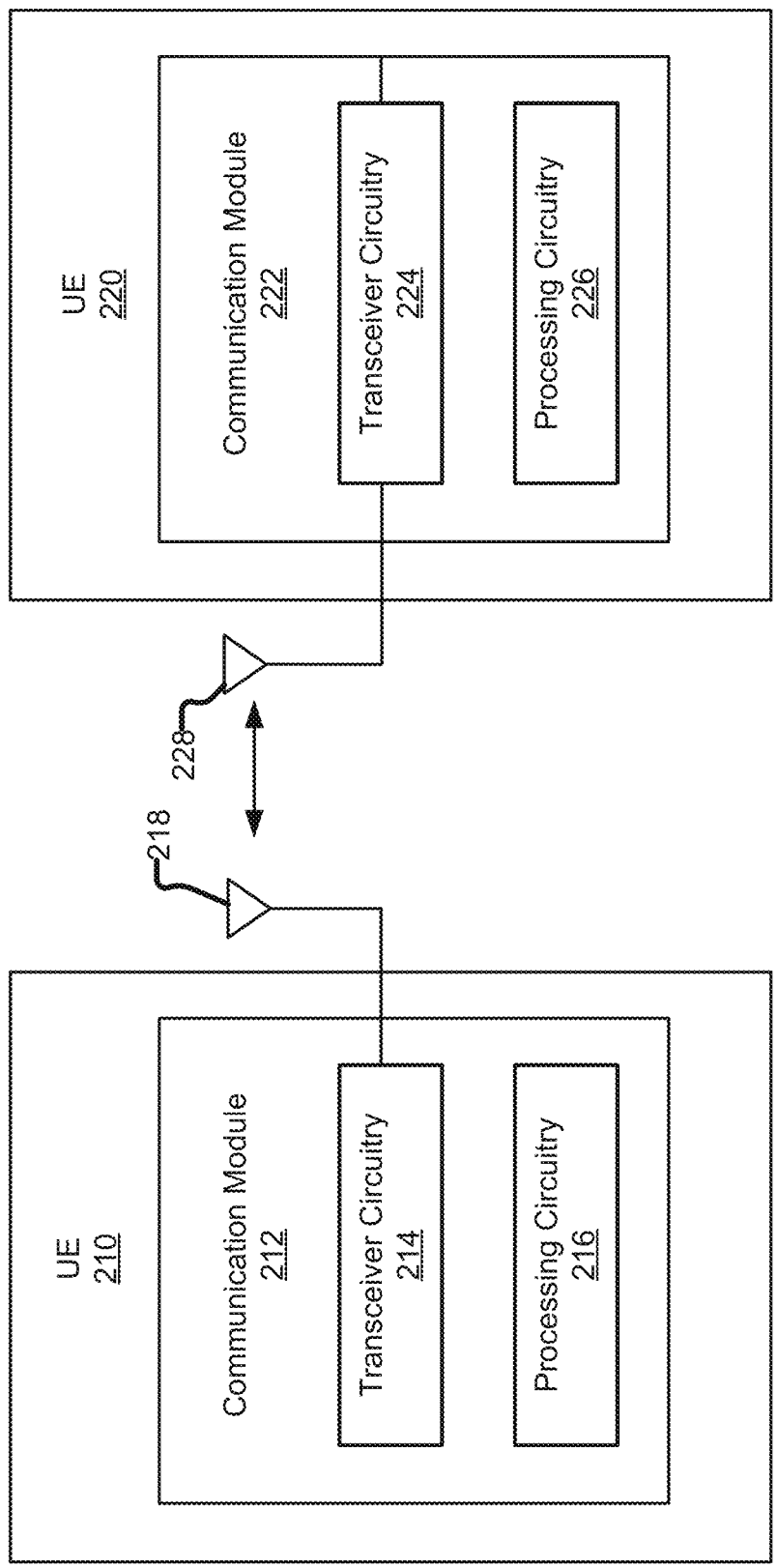
FIG. 2 is a schematic block diagram illustrating two user equipment (UE) devices in a D2D communication mode in accordance with various embodiments.

Referring now to FIG. 2, it is a schematic block diagram illustrating UEs 210 and 220 in a D2D communication mode in accordance with various embodiments. The UE 210 or 220 may be similar to, and substantially interchangeable with, UE 132, 134, or 136 of FIG. 1. In embodiments, the UE 210 may include one or more antennas 218 and communication module 212. In various embodiments, transceiver circuitry 214 and processing circuitry 216 within the communication module 212 may be coupled with each other as shown. Likewise, the UE 220 may include one or more antennas 228 and communication module 222. In various embodiments, transceiver circuitry 224 and processing circuitry 226 within the communication module 222 may be coupled with each other as shown.

In the D2D communication mode, UEs 210 and 220, whether within network coverage or in partial or outside network coverage, would essentially be operating in a form of TDD mode because D2D devices would transmit and listen on the same carrier subject to half-duplex constraints. Therefore, a challenge rises to accommodate the Tx/Rx switching time of about a length of 624 $T_s$, which is about 20.3 microseconds (μs) as one $T_s$ is 1/(15000*2048) seconds.

Further, UEs 210 and 220 may need to consider the AGC setting time in the D2D communication mode. The AGC operations in D2D communications are different from those in cellular operations where UEs receive packets only on DL carrier (FDD) or subframes (TDD). In the D2D communications, different UEs may be frequency-multiplexed for different subframes. Further, subframe sets may also depend on the use of different forms of multiple transmission time interval (TTI) transmissions for D2D discovery and communications. Due to the random nature of AGC operations in the D2D communications, UE 210 or 220 may need different AGC setting times for different subframes.

In various embodiments, the communication module 222 may be coupled with the antennas 228 to facilitate over-the-air communication of signals between UE 220 and UE 210 or another UE. For example, the transceiver circuitry 224 may be configured to provide various signal processing operations on the signal to the antennas 228 with suitable characteristics. In various embodiments, operations of the transceiver circuitry 224 may include, but are not limited to, filtering, amplifying, storing, modulating, demodulating, transforming, etc.

The transceiver circuitry 224 may be configured to receive signals from the antennas 228, and then transmit the signals to other components of the UE 220 and/or for internal processing by the processing circuitry 226. In some embodiments, the processing circuitry 226 may generate a guard interval at a subframe for the provision of the Tx/Rx switching time required for D2D communications at a receiving UE. As an example, the processing circuitry 226 may generate a cyclic prefix (CP) for the first or second symbol of a D2D subframe at an orthogonal frequency division multiplexing (OFDM) resource block or a single-carrier frequency-division multiple access (SC-FDMA) resource block. In the disclosure herein, such CP may also be referred to as the CP for the first or second OFDM/SC-FDMA symbol, or simply the first or second symbol. In various embodiments, the CP may be long enough (e.g., having a length greater than 33.33 μs) to accommodate the Tx/Rx switching time required for D2D communications (e.g., about 20.3 μs).

In various embodiments, the processing circuitry 226 may generate a guard interval at the first symbol of a subframe for the provision of the AGC setting time at the receiving UE. In some embodiments, the processing circuitry 226 may transmit a reference signal (e.g., uplink demodulation reference signal (UL-DMRS)) in the first OFDM/SC-FDMA symbol for the provision of AGC setting time. In some embodiments, the processing circuitry 226 may transmit one or more random quadrature phase shift keying (QPSK) symbols in the first OFDM/SC-FDMA symbol for the provision of AGC setting time. In various embodiments, such guard interval may have a length greater than 33.33 microseconds. Therefore, the processing circuitry 226 may accommodate the AGC setting time and the Tx/Rx switching time for D2D subframes. In some embodiments, the processing circuitry 226 may also use similar techniques to accommodate the AGC setting time and the Tx/Rx switching time at D2D and WAN subframe boundaries, e.g., during the transition between D2D communication and UE-to-eNB communication.

In some embodiments, the UE 220 may include one or more antennas 228 to concurrently utilize radio resources of multiple respective component carriers. For example, the UE 220 may be configured to communicate using orthogonal frequency division multiple access (OFDMA) (in, e.g., downlink communications) and/or single-carrier frequency-division multiple access (SC-FDMA) (in, e.g., uplink communications). In some embodiments, the UE 220 may use the transceiver circuitry 224 to communicate with another UE via LTE ProSe or LTE Direct. In some embodiments, the UE 220 may use the processing circuitry 226 to generate subframes that have appropriate guard intervals for both D2D discovery and communication in LTE ProSe or LTE Direct.

In some embodiments, communication module 222 may be configured to provide communication services for one or more subscriber identity modules (SIMs) (not shown) with which it is coupled. In some embodiments, the SIMs may be removably coupled with the communication module 222. In other embodiments, the SIMs may be hardware and/or firmware that are permanently coupled with the UE 220. In various embodiments, the SIMs may include full-size SIMs, mini-SIMs, micro-SIMs, nano-SIMs, embedded SIMs, and/or virtual SIMs.

The SIMs may be integrated circuits that securely store subscriber identity information such as international mobile subscriber identity (IMSI) and related keys used to identify and authenticate one or more subscribers using the UE 220. Each SIM may be associated with different subscriber identity information and may or may not be associated with different carriers. In various embodiments, IMSI and related information may be used to facilitate D2D discovery and D2D communications.

Figure 12:
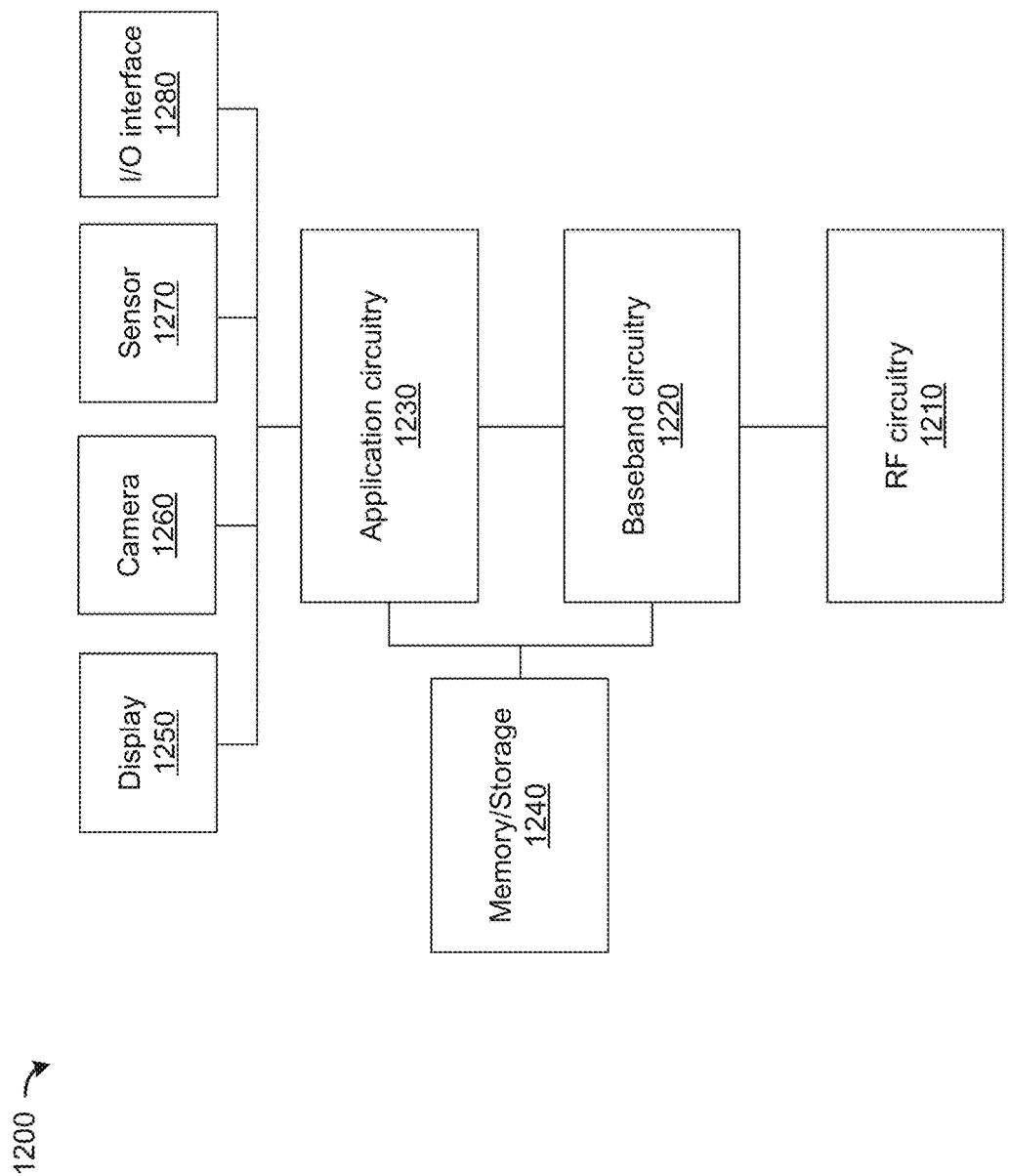
FIG. 12 is a block diagram of an example computing device that may be used to practice various embodiments described herein.

Some or all of the transceiver circuitry 224 and/or processing circuitry 226 may be included in, for example, radio frequency (RF) circuitry or baseband circuitry as described below with respect to FIG. 12. In various embodiments, the UE 220 or 210 may be, may include, or may be included in a single sensor device, a cellular telephone, a personal computer (PC), a notebook, an ultrabook, a netbook, a smartphone, an ultra mobile PC (UMPC), a handheld mobile device, a universal integrated circuit card (UICC), a personal digital assistant (PDA), a Customer Premise Equipment (CPE), a tablet computing device, or other consumer electronics such as MP3 players, digital cameras, and the like. In some embodiments, the UE may include a mobile station, as defined by IEEE 802.16e (2005 or 802.16m (2009) or some other revision of the IEEE 802.16 standard, or user equipment, as defined by 3GPP LTE Release 8 (2008), Release 9 (2009), Release 10 (2011), Release 12 (2014), Release 13 (under development), or some other revision or release of the 3GPP LTE standards.

Figure 3:
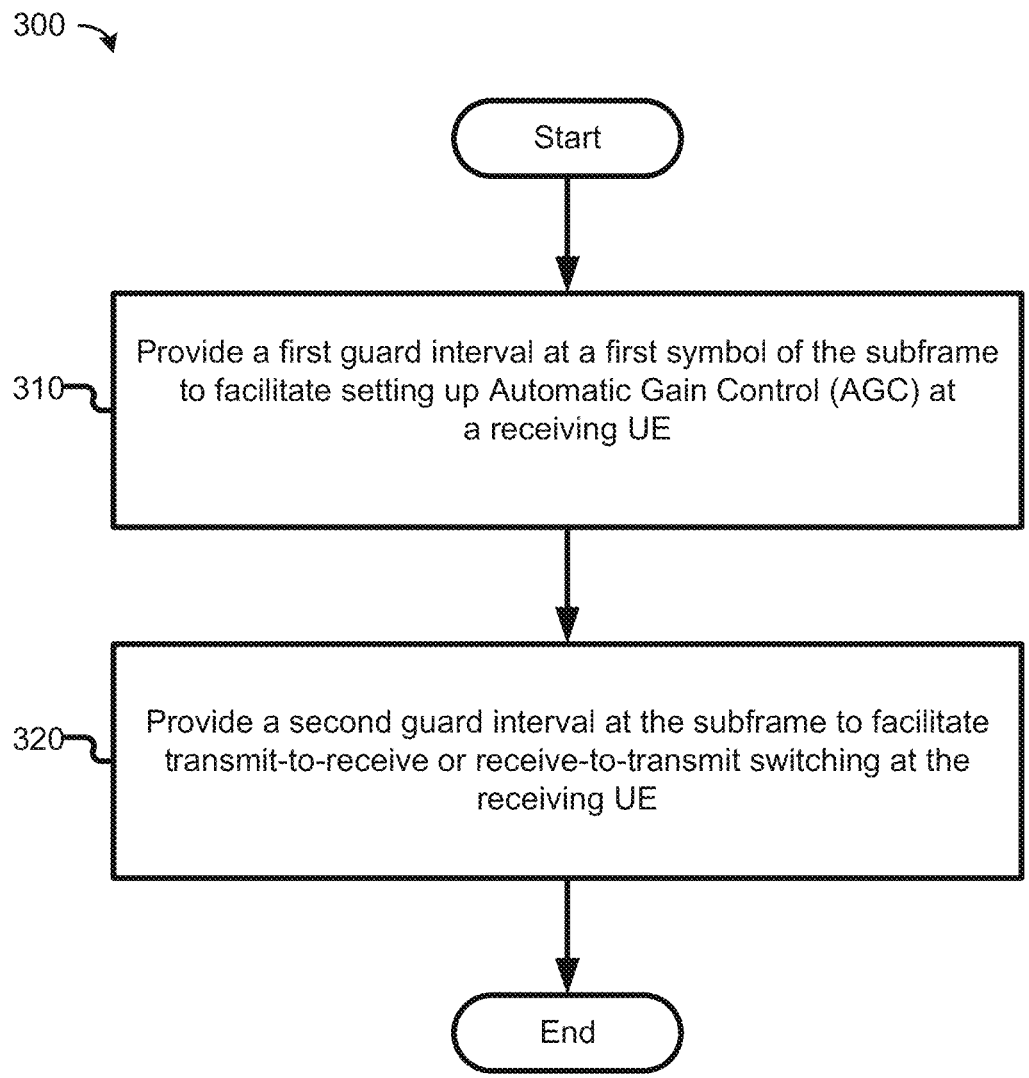
FIG. 3 is a flowchart illustrating a process for generating D2D subframes in accordance with various embodiments.

FIG. 3 is a flowchart illustrating a process for generating D2D subframes in accordance with various embodiments. The process 300 may be performed by a UE, e.g., the UE 210 or 220 of FIG. 2 or any one of the UEs of FIG. 1, such as the UE 132, 134, or 136. In various embodiments, the process 300 may enable a UE to accommodate the AGC setting time and the Tx/Rx switching time needed between two D2D subframes or in D2D and WAN subframe boundaries.

The process 300 may include, at 310, providing a first guard interval at a first symbol of the subframe to facilitate setting up AGC at a receiving UE. In some embodiments, the first guard interval may be set by the processing circuitry 216 or 226 of FIG. 2. In some embodiments, the subframe may be located at an orthogonal frequency division multiplexing (OFDM) resource block or a single-carrier frequency-division multiple access (SC-FDMA) resource block.

A CP for a symbol may be a repetition of the end of the symbol. A CP may serve as a guard interval to help the receiving UE to eliminate the inter-symbol interference from the previous symbol. Further, a CP may facilitate simple frequency-domain processing, such as channel estimation and equalization, since its characteristic of repetition may enable a frequency-selective multipath channel to be modelled as circular convolution. In various embodiments, the receiving UE may discard the CP portion of the symbol. Thus, the CP may be used as a guard interval.

In some embodiments, a CP for the first symbol of the subframe may be generated as the first guard interval. In some embodiments, the CP generated for the first symbol may have a length greater than 33.33 microseconds. In some embodiments, the CP for the second symbol of the subframe may be generated as the first guard interval. The CP in this case may have a length greater than 66.67 microseconds.

The process 300 may further include, at 320, providing a second guard interval at the subframe to facilitate Tx/Rx switching at the receiving UE. In some embodiments, the second guard interval may be set by the processing circuitry 216 or 226 of FIG. 2. In some embodiments, at least a part of the last symbol in a subframe may be punctured as the second guard interval to accommodate the Tx/Rx switching time needed at a receiving UE. In some embodiments, at least a part of the first symbol in a subframe may be punctured as the second guard interval to accommodate the Tx/Rx switching time needed at a receiving UE. In some embodiments, at least a part of the last symbol and at least a part of the first symbol may be punctured as the second guard interval to accommodate the Tx/Rx switching time needed at a receiving UE. In various embodiments, the partially or fully punctured portion of the symbol may not be transmitted.

Figure 4:
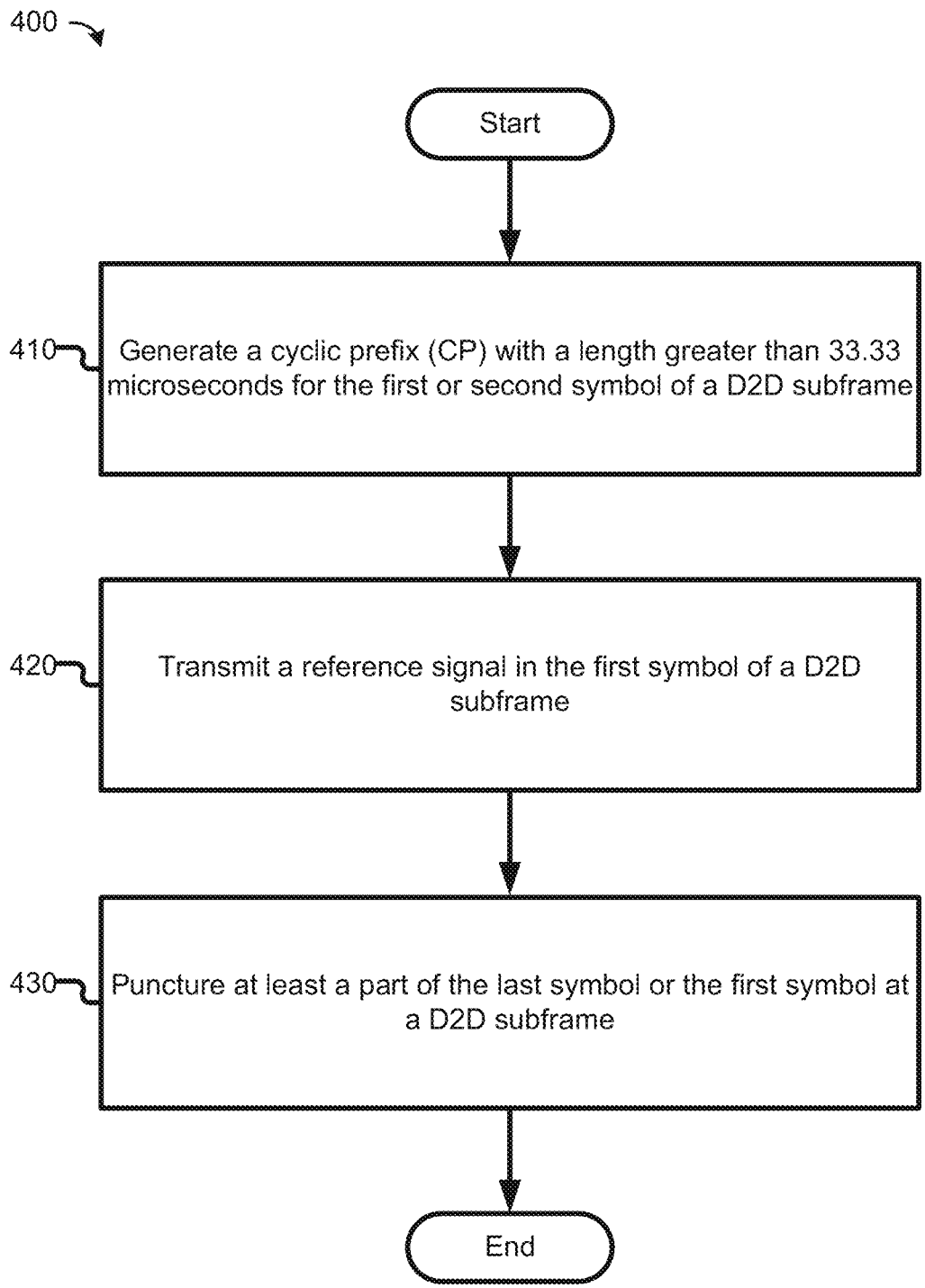
FIG. 4 is a flowchart illustrating another process for generating D2D subframes in accordance with various embodiments.

FIG. 4 is a flowchart illustrating another process for generating D2D subframes in accordance with various embodiments. The process 400 may be performed by a UE, e.g., the UE 210 or 220 of FIG. 2 or any one of the UEs of FIG. 1, such as the UE 132, 134, or 136.

The process 400 may include, at 410, generating a CP with a length greater than 33.33 microseconds for the first or second symbol of a D2D subframe to facilitate setting up AGC at the receiving UE. Due to the random nature of AGC operations in the D2D communications, the receiving UE may need different AGC setting times for different subframes. Therefore, the AGC setting time in a subframe may need to be long enough to cover such variations. In various embodiments, such CP may have a length greater than 33.33 microseconds to accommodate the AGC setting time.

In some embodiments, the CP to accommodate the AGC setting time may be generated for the first symbol, e.g., using only the first half of the first symbol as the CP. In some embodiments, the CP to accommodate the AGC setting time may be generated for the second symbol, e.g., using only the second half of the first symbol as the CP or using the whole first symbol as the CP. In the latter case, the CP for the second symbol may have a length greater than 66.67 microseconds. In various embodiments, different CP designs for the first or second symbol may be used to cater different D2D applications.

The process 400 may further include, at 420, transmitting a signal in the first symbol of a D2D subframe to facilitate setting up AGC at the receiving UE. In some embodiments, the signal may be a UL-DMRS or an AGC reference signal (RS). In some embodiments, random quadrature phase shift keying (QPSK) symbols may be mapped to the resource elements (REs) of the first symbol. In some embodiments, a normal (about 4.7 μs) or extended (about 16.7 μs) CP may be commonly provided for LTE subframes; thus, the useful symbol length may be shorter than the whole symbol length after the regular CP application. In some embodiments, the CP at the first half of a useful symbol length of the first symbol may be generated based on the second half of the useful symbol length of the first symbol. Further, the UL-DMRS may be still kept to the second half of the useful symbol length of the first symbol.

In some embodiments, a new AGC reference signal may also be defined for AGC setting purposes. The AGC RS may use a suitable reference signal sequence with a low peak-to-average-power-ratio (PAPR) common to many transmitting UEs. Further, the AGC RS may be defined on a per-resource block or on a per-resource block set basis. In some embodiments, similar performance may also be realized with the transmission of random QPSK symbols during the first symbol for accommodating the AGC setting time.

The process 400 may further include, at 430, puncturing at least a part of the last symbol or the first symbol at the subframe as the second guard interval. In some embodiments, at least a part of the last symbol in a subframe may be punctured as the second guard interval to accommodate the Tx/Rx switching time needed at the receiving UE. In some embodiments, at least a part of the first symbol in a subframe may be punctured as the second guard interval to accommodate the Tx/Rx switching time needed at the receiving UE.

In some embodiments, there is no need to puncture the last or the first symbol if the subframe is to be transmitted ahead of a serving or camping cell downlink (DL) reference time in a time division duplex (TDD) deployment. In some embodiments, a D2D subframe may be transmitted at least 624 basic time units ahead of a serving or camping cell downlink reference time in TDD deployments wherein one basic time unit equals 1/30720000 seconds. The offset of at least 624 basic time units may be sufficient to cover the Tx/Rx switching time of about 20.3 μs. Such full transmission of the last symbol may be applied at least to TDD systems in some cases.

In some embodiments, all D2D UEs, with or without an active timing advance (TA) value, may transmit according to the DL reference time (T1) with an offset (e.g., offset T2=624 Ts). In other words, UEs may transmit at time T=T1−T2 when there is no UL WAN subframe immediately following the D2D subframe. Therefore, the overlap between D2D and UL WAN subframes may be avoided. Furthermore, this scheme for D2D transmission in TDD systems may allow better coding gain by not puncturing the last symbol if the D2D subframe is not followed by a UL subframe.

In some embodiments, the last symbol of the D2D subframe may be used as a gap using legacy UL subframe structure, and no special handling of the first symbol of the D2D subframe may be needed. In some embodiments, irrespective of whether the last or first symbol of the D2D subframe are punctured, an increased gap for handling of Tx/Rx switching time may be accommodated by transmitting a D2D subframe at least 624 basic time units (e.g., one basic time unit equals 1/30720000 seconds) ahead of a corresponding reference time of the D2D subframe. As an example, UE 1 may receive D2D transmissions from UE 2 on subframe n. Subframe n+1 may be a cellular UL subframe on which UE 1 is scheduled to transmit UL PUSCH to the serving cell (e.g., when UE 1 is in a connected mode with the serving cell). The PUSCH is transmitted following a transmission time given by T=(DL reference time−X), where X=($N_{TA}$+$N_{TAoffset}$) $T_s$, where $N_{TA}$ is the TA command from the eNB, and $N_{TAoffset}$ is 624 $T_s$. If the subframe n is transmitted with the additional 624 $T_s$ advancement from UE2, UE 1 now may get this additional amount of time-gap (e.g., on top of the last symbol gap in the D2D subframe) to switch from Rx to Tx mode. Thus, UE 1 may transmit subframe n+1 with the application of the appropriate timing advance. This may be helpful especially in cases when the $N_{TA}$ value that UE 1 needs to apply on subframe n+1 is large, e.g., comparable to one symbol time-duration.

In some embodiments, a UE may be in RRC Connected mode with a serving cell. In some embodiments, a UE may camp on a camping cell in RRC Idle mode, e.g., to perform cell selection, to receive information from the LTE network. Thus, the UE may have the corresponding serving cell downlink reference time in RRC Connected mode, and have the corresponding camping cell downlink reference time in RRC Idle mode.

In various embodiments, a D2D subframe may be transmitted at least 624 basic time units ahead of a serving or camping cell downlink reference time in the time division duplex deployment. Thus, with the puncturing of the last symbol of the D2D subframe, the receiving D2D UE may get at least additional 624 $T_s$ to switch to Tx mode, and may transmit the next subframe with the appropriate timing advancement.

In some embodiments, a UE may transmit D2D transmissions according to a serving cell uplink reference time (SCDRT) in a time division duplex deployment, wherein SCDRT=SCDRT−TA, wherein SCDRT refers to the Serving Cell Downlink Reference Time (SCDRT), and TA is the active timing advance value. In this case, the D2D subframe may be transmitted with appropriate timing advancement at a transmission time given by T=SCURT−624 $T_s$.

FIGS. 5-11 are schematic diagrams illustrating subframe designs in accordance with various embodiments. FIGS. 5-11 may illustrate different schematic diagrams for alternative D2D signal structures and their variants to accommodate the AGC setting time and the Tx/Rx switching time needed at a receiving UE. In various embodiments, data symbols may be mapped to the first and/or last symbol. Further, the first and/or last symbol may be punctured, e.g., the transmitting UE may transmit only a part of the OFDM/SC-FDMA symbol to provide guard intervals needed at the receiving UEs. Various different design alternatives incorporating this design principle will be more fully described below.

Figure 5:
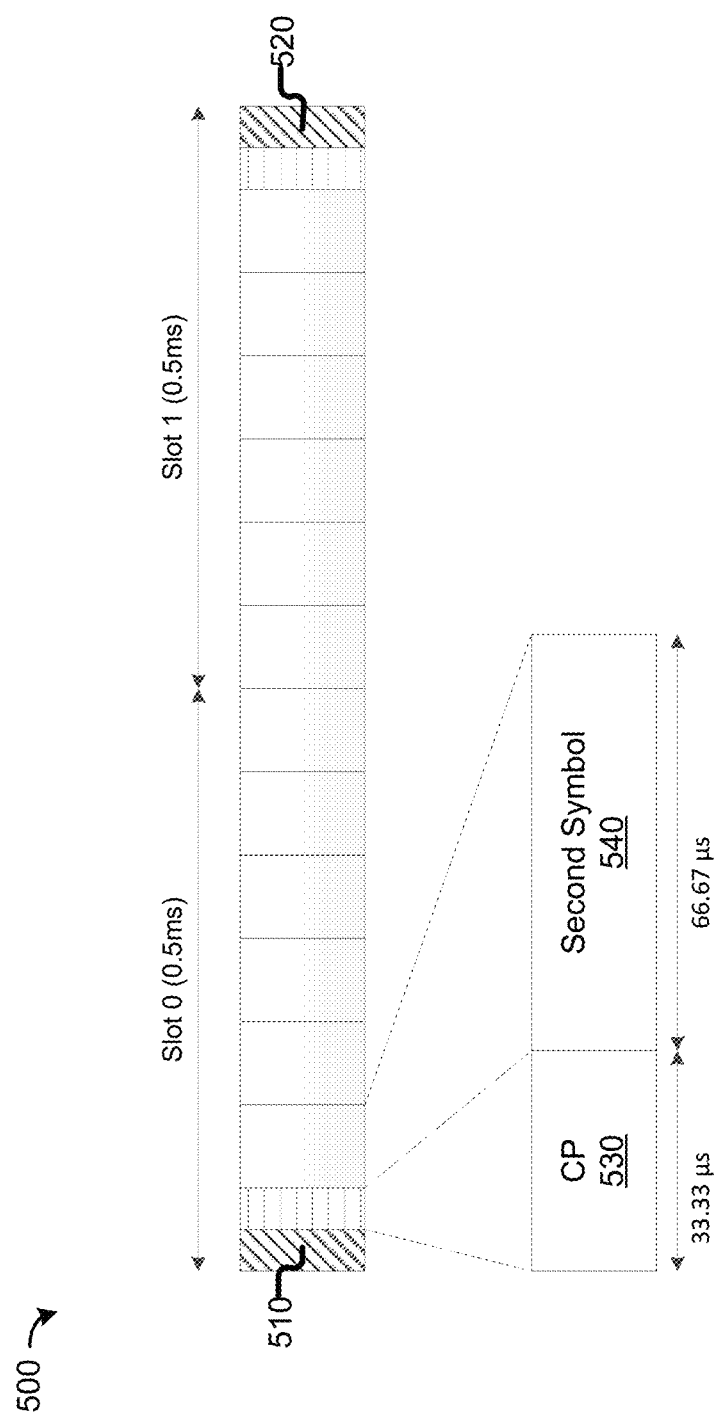
FIGS. 5-11 are schematic diagrams illustrating subframe designs in accordance with various embodiments.

FIG. 5 is a schematic diagram illustrating subframe 500. The subframe 500 may include two slots, each having a length of about 0.5 milliseconds, and including seven symbols. According to one embodiment, the first half of the first symbol 510 or the second half of the last symbol 520 may be punctured, thus not to be transmitted. Therefore, the receiving UE may obtain at least 66.67 microseconds of guard interval as the Tx/Rx switching time.

Further, the second half of the first symbol may be used as an effectively longer CP 530 for the second data symbol 540. The CP may be generated using the second half of the second data symbol 540. Note that the CP here refers to a new effective CP in addition to the regular CP application, normal or extended, which may already be applied to the first or second symbol. Therefore, subframe 500 may provide better protection to the second data symbol 540 because the CP length is effectively increased. As a result, the CP may have a length of 33.33+4.7 microseconds in a regular LTE CP application, or 33.33+16.7 microseconds in an extended LTE CP application. Meanwhile, subframe 500 may now provide at least 33.33 microseconds for the receiver to set up AGC.

In various embodiments, subframe 500 may be modified to have the entire last symbol punctured out or alternatively to keep the entire last symbol for transmission. The former modification may provide even longer provision for the Tx/Rx switching time. The latter modification of full transmission of the last symbol may be applied at least to TDD systems. In that case, a UE may transmit subframe 500 at time T=T1−T2 when there is no UL WAN subframe immediately following the D2D subframe, wherein T1 is the DL reference time, and T2 is the offset, e.g., 624 Ts.

Figure 6:
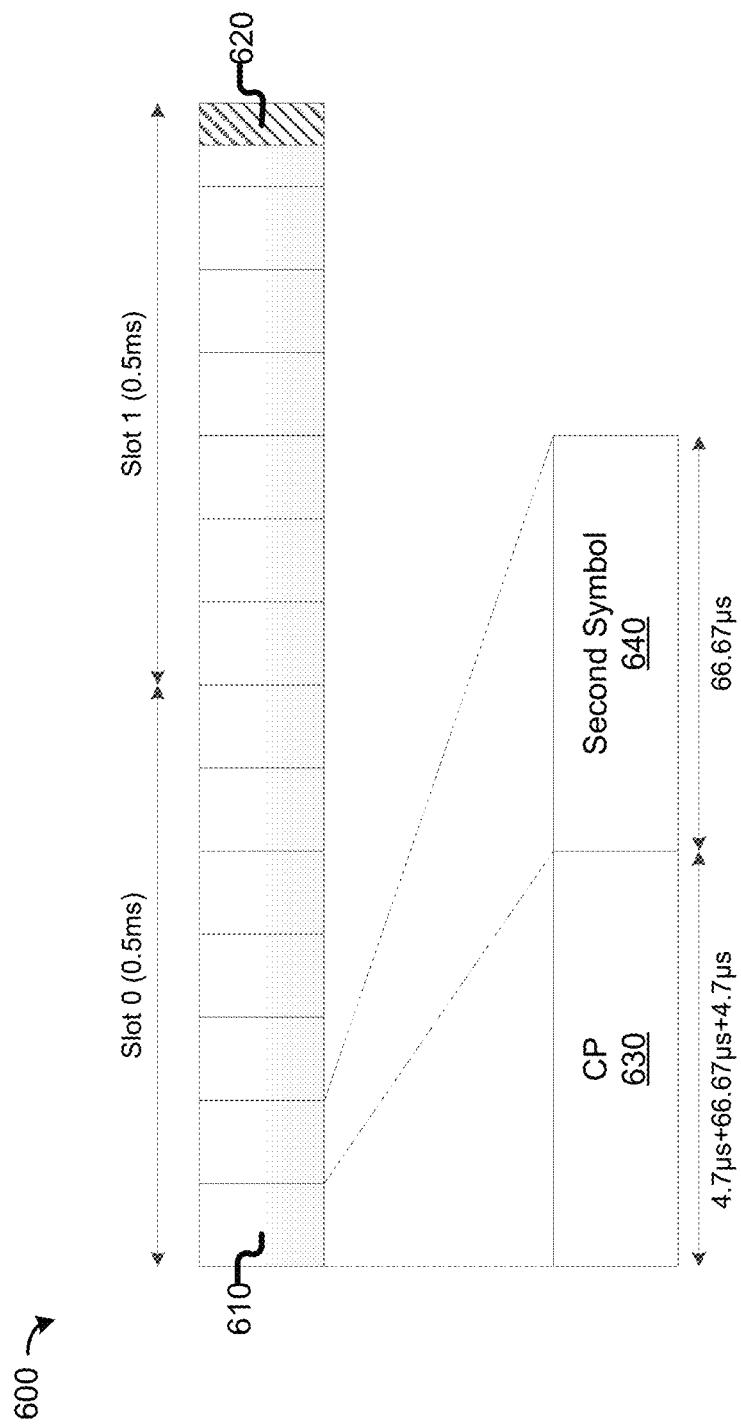

FIG. 6 is a schematic diagram illustrating subframe 600. The subframe 600 may include two slots, each having a length of about 0.5 milliseconds, and including seven symbols. According to one embodiment, the second half of the last symbol 620 may be punctured, thus not to be transmitted. Therefore, the receiving UE may obtain at least 33.33 microseconds of guard interval as the Tx/Rx switching time. In other embodiments, the guard time to accommodate the Tx/Rx switching time may be achieved by partial, full, or no puncturing of the last symbol according to the actual application at D2D communications.

Comparing the subframe 600 to the subframe 500 in FIG. 5, there is no puncturing of the first half of the first symbol 610 at the subframe 600. Instead, the entire first symbol may be used as a much longer CP for the second data symbol 640. The CP 630 may be generated based on the second data symbol 640. In various embodiments, the prolonged CP 630 may provide better protection for the second data symbol 640 as well as to provide longer time for the receiving UE for setting up AGC.

The subframe 500 or 600 exploits the first symbol to generate a substantially prolonged effective CP for the second symbol. In various embodiments, the original CP for the second symbol (e.g., 4.7 µs for normal CP application) may therefore be omitted if the AGC setting time at the receiving UE can be accommodated within 33.33 µs and 66.67 µs (without considering the original CP of 4.7 µs for the first symbol) for subframes 500 and 600 respectively. Resultantly, the entire length of the second symbol may be utilized to transmit data.

Figure 7:
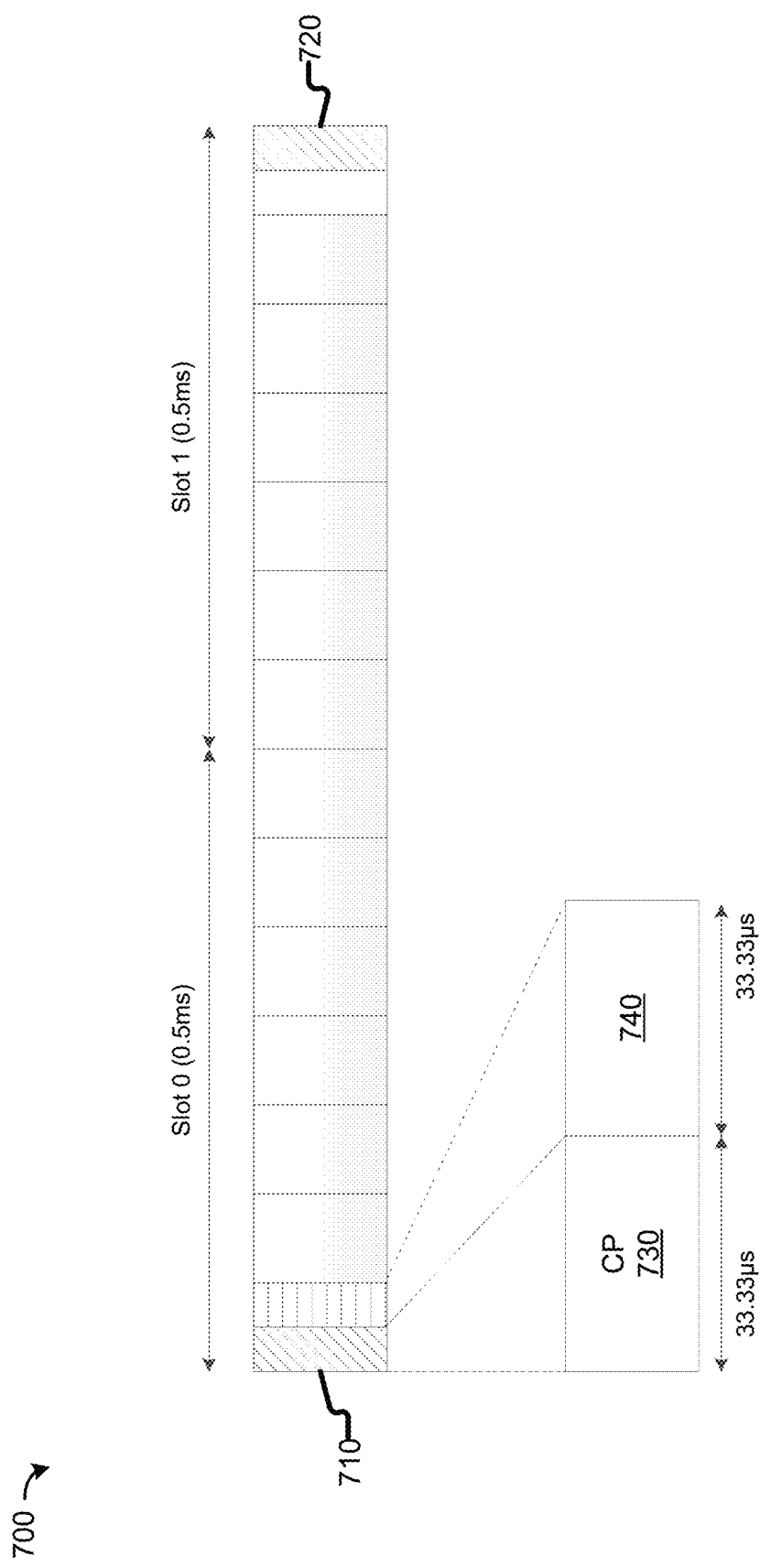

FIG. 7 is a schematic diagram illustrating subframe 700. The subframe 700 may include two slots, each having a length of about 0.5 milliseconds, and including seven symbols. According to one embodiment, the second half of the last symbol 720 may be punctured. Therefore, the receiving UE may obtain at least 33.33 microseconds of guard interval as the Tx/Rx switching time.

In other embodiments, the guard time to accommodate the Tx/Rx switching time may be achieved by partial, full, or no puncturing of the last symbol according to a particular D2D application. As an example, the last symbol may not need to be punctured at all if guard time handling is not handled within the D2D discovery or communication region. Instead, the provision for Tx/Rx switching time may be handled via scheduler restrictions for D2D and WAN subframe boundaries.

Compared to the subframe 500 or 600, the subframe 700 may provide better coding gain that improves packet detection probability. In various embodiments, the first half of the first symbol 710 is not punctured. Instead, the first half of the first symbol 710 may be used to generate an effective CP 730 for the second half 740 at the first symbol 710. Consequently, the CP 730 may provide at least 33.33 microseconds, in addition to the normal or extended CP applied for D2D subframes, for the receiving UE to set up AGC. As an example, the CP 730 may employ a CP length of 38.03 microseconds (e.g., 33.33 µs of the first half of the first symbol, plus 4.7 µs of the normal CP provided for the first symbol) to accommodate the AGC setting time. Compared to the subframe 500 or 600, the subframe 700 does not provide any additional protection to the second symbol, but provides better coding gain.

Figure 8:
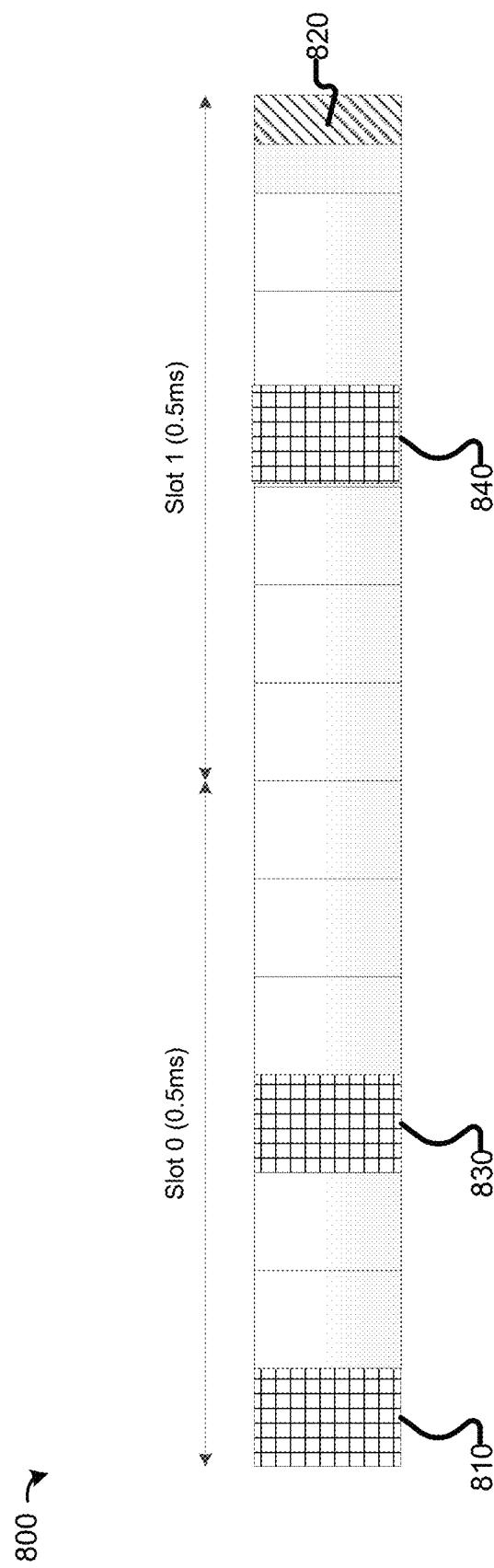

FIG. 8 is a schematic diagram illustrating subframe 800. The subframe 800 may include two slots, each having a length of about 0.5 milliseconds, and including seven symbols. According to one embodiment, the second half of the last symbol 820 may be punctured to provide the receiving UE at least 33.33 microseconds of guard interval as the Tx/Rx switching time.

In various embodiments, a UL-DMRS may be transmitted in the first symbol 810 in addition to those UL-DMRS transmitted in the fourth symbol 830 and the eleventh symbol 840 of the subframe 800. In one embodiment, the base sequence and cyclic shift used for the UL-DMRS on the first symbol 810 may be the same as those used for the UL-DMRS on the fourth symbol 830 or the eleventh symbol 840.

In some embodiments, depending on the time required for setting up AGC, the first symbol 810 may be generated by mapping a regular UL-DMRS to the subcarriers. In this case, the subframe 800 may provide about 71.37 microseconds (e.g., 66.67 µs of the first symbol, plus 4.7 µs of the normal CP provided for the second symbol) for the AGC setting time at the receiver. In some embodiments, the first half of the first symbol 810 may be punctured, instead of or in addition to the last symbol 820 being punctured, to provide additional guard period for handling the Tx/Rx switching time. In other embodiments, the puncturing of the first symbol 810 may not be necessary if the guard period is accommodated via partial or full puncturing of the last symbol 820.

Figure 9:
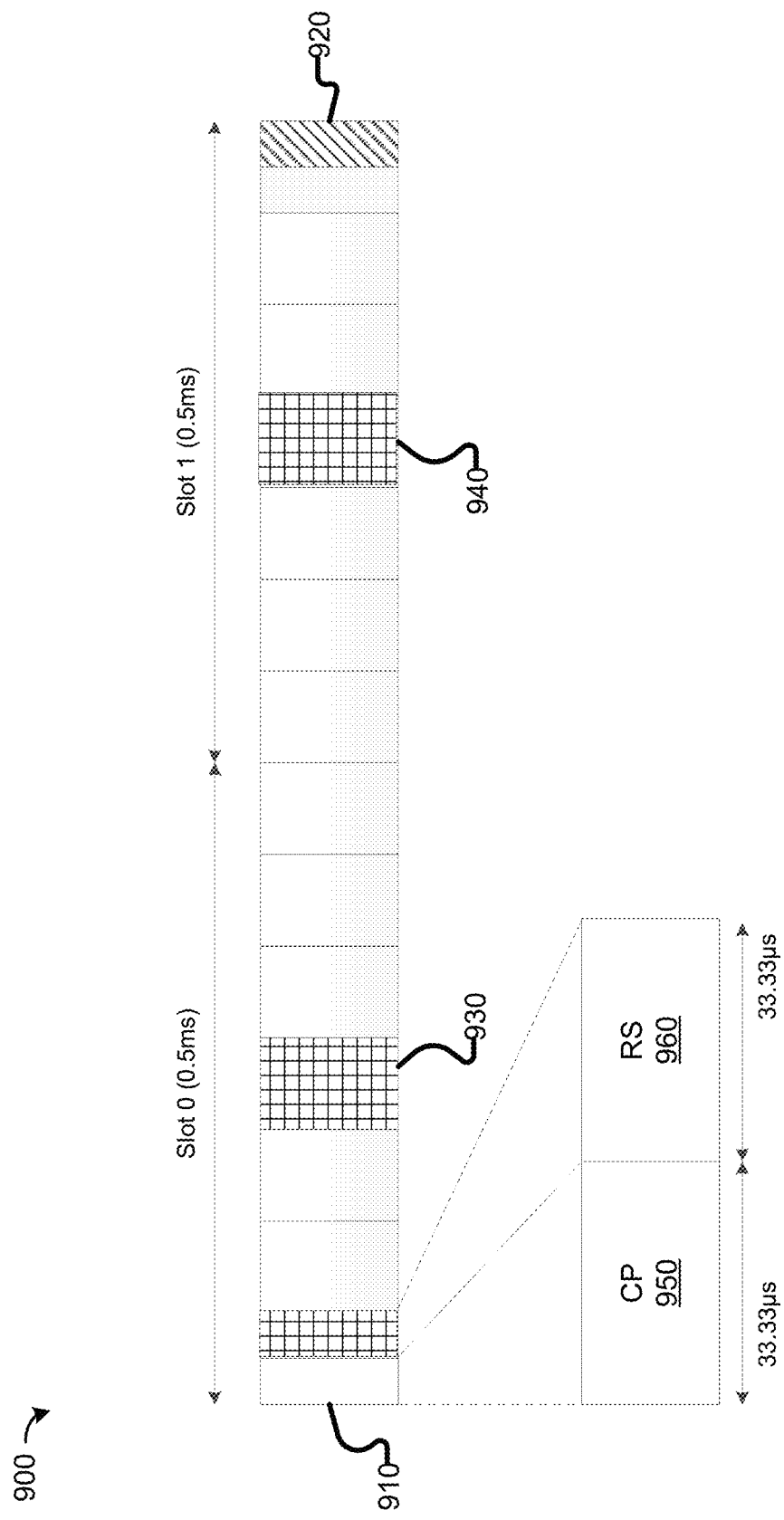

FIG. 9 is a schematic diagram illustrating subframe 900. The subframe 900 may be similar to the subframe 800 in that the second half of the last symbol 920 may be punctured to provide the receiving UE at least 33.33 microseconds of guard interval as the Tx/Rx switching time in some embodiments. Also similarly, in various embodiments, a UL-DMRS may be transmitted in the first symbol 910 in addition to those UL-DMRS transmitted in the fourth symbol 930 and the eleventh symbol 940 of the subframe 900.

In some embodiments, the required AGC setting time may be handled within 33.33 microseconds. Therefore, after mapping a UL-DMRS to the first symbol 910, an effective CP 950 may be generated at the first half of the first symbol 910, e.g., based on the second half of the first symbol 910, which still contains the partial reference signal 960. The CP in this case may have a length of at least 33.33 microseconds. Such a structure may facilitate better channel estimation and time tracking. For example, the partial reference signal 960 in the second half of the first symbol 910 may be used to enhance channel estimation, time tracking (e.g., provide more robustness to time offsets between Tx UE and Rx UE by enabling better time tracking), etc. However, the partial reference signal 960 at the first symbol 910 may not be guaranteed to be usable for channel estimation, time tracking, etc.

In various embodiments, all the subcarriers for the first symbol 910 may be loaded as the Physical Uplink Shared Channel (PUSCH) DMRSs. In various embodiments, the first half of the first symbol 910 may also be punctured to accommodate the AGC setting time and the Tx/Rx switching time.

Figure 10:
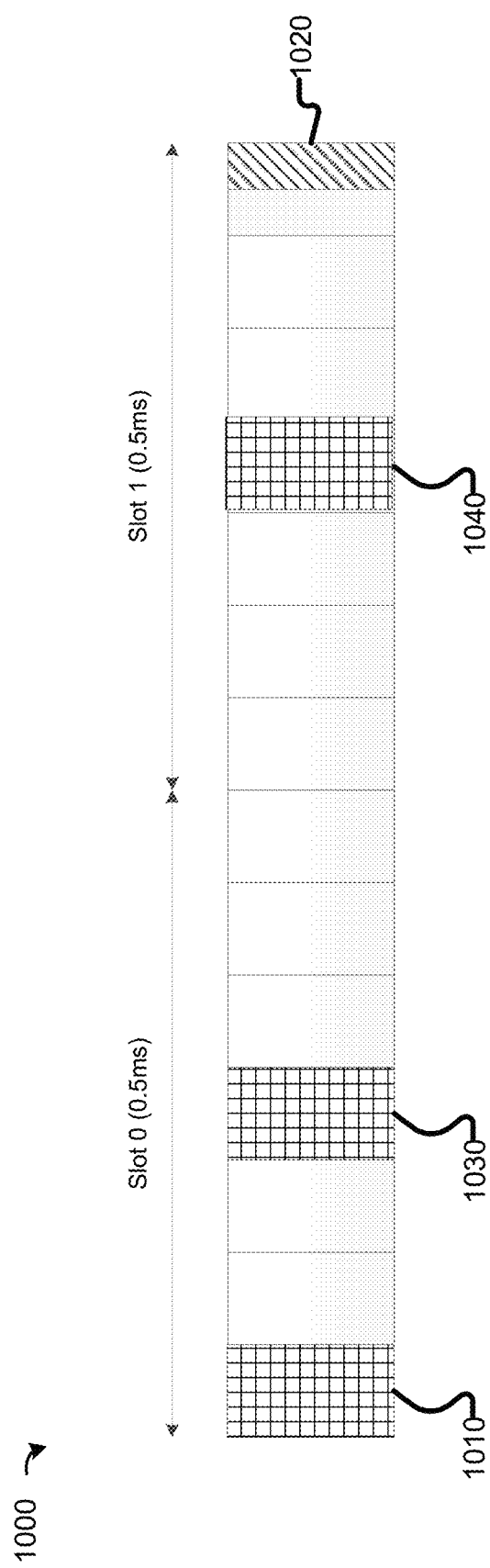

FIG. 10 is a schematic diagram illustrating subframe 1000. The subframe 1000 may be similar to the subframe 800 in that the second half of the last symbol 1020 may be punctured to provide the receiving UE at least 33.33 microseconds of guard interval as the Tx/Rx switching time in some embodiments. Also similarly, UL-DMRS may be transmitted in the fourth symbol 1030 and the eleventh symbol 1040 of the subframe 1000.

However, the subframe 1000 may use the first symbol 1010 to carry an AGC RS rather than the UL-DMRS transmission as in the subframe 800. In some embodiments, the AGC RS may have a low PAPR. In some embodiments, the AGC RS may be defined on a per-resource block (RB) or on a per-resource block sets basis. Any UE transmitting on the same RB may send the same sequence as the AGC RS. The AGC RS may also be the same for all physical resources.

Similar to the subframe 800, the subframe 1000 may also provide about 71.37 microseconds (e.g., 66.67 µs of the first symbol, plus 4.7 μs of the normal CP provided for the second symbol) for the AGC setting time at the receiver. In some embodiments, the first half of the first symbol 1010 may be punctured, instead of or in addition to the last symbol 1020 being punctured, to provide additional guard period for handling the Tx/Rx switching time.

Similar to the subframe 900, the subframe 1000 may generate an effective CP at the first half of the first symbol 1010, e.g., based on the second half of the first symbol 1010, in some embodiments. However, the AGC RS may not be used to improve the channel estimation and time tracking for the demodulation of the message packet since the AGC RS is common to UEs.

Figure 11:
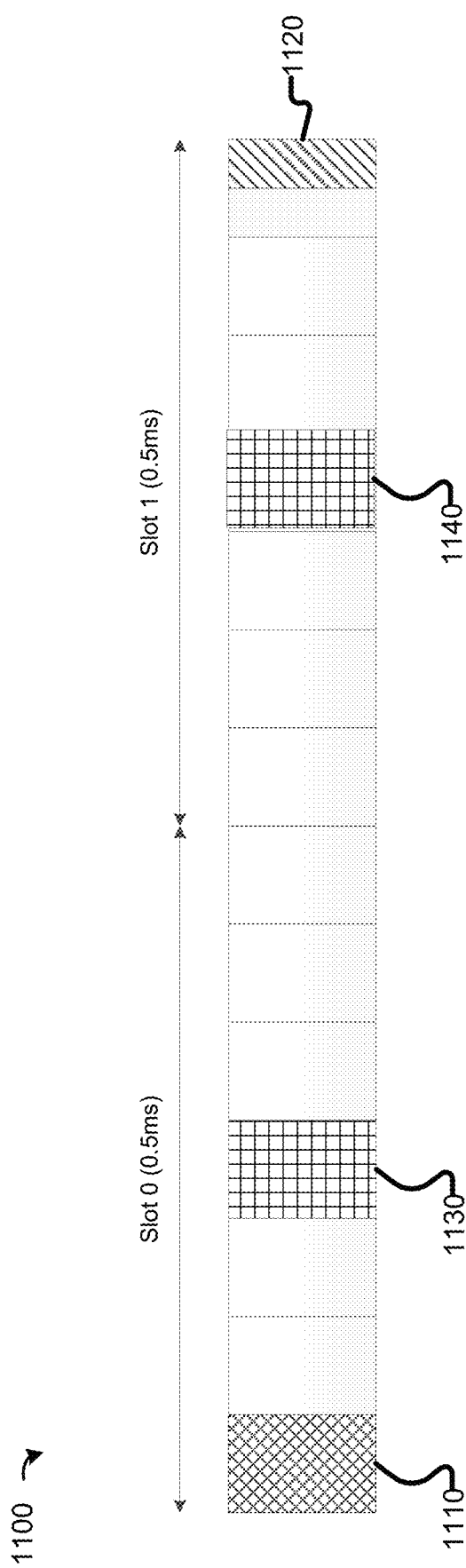

FIG. 11 is a schematic diagram illustrating subframe 1100. The subframe 1100 may be similar to the subframe 1000 in that the second half of the last symbol 1120 may be punctured to provide the receiving UE at least 33.33 microseconds of guard interval as the Tx/Rx switching time in some embodiments. Also similarly, UL-DMRS may be transmitted in the fourth symbol 1130 and the eleventh symbol 1140 of the subframe 1100.

However, the subframe 1100 may use the first symbol 1110 to carry random QPSK symbols rather than an AGC RS in the subframe 1000. Similarly, the subframe 1100 may be modified by puncturing the first half of the first symbol 1110 at the transmitter side if guard period handling (e.g., for Tx/Rx switching time) needs to be applied at the first symbol 1110.

Finally, the special handling for the first and/or last symbols, as described in connection with FIGS. 8-11, may not be applied to those subframes that occur within multi-TTI transmissions. For instance, if an individual discovery resource comprises one or two physical resource blocks (PRBs) in frequency dimension and two TTIs in time (e.g., for two subframes), then the last symbol of the first TTI and the first symbol of the second TTI may need to be used as regular symbols to realize higher coding gains.

The UE 210 or 220 as described in connection with FIG. 2 may be implemented into a system using any suitable hardware, firmware, and/or software configured as desired. FIG. 12 illustrates, for one embodiment, an example system 1200 comprising radio frequency (RF) circuitry 1210, baseband circuitry 1220, application circuitry 1230, memory/storage 1240, display 1250, camera 1260, sensor 1270, and input/output (I/O) interface 1280, coupled with each other at least as shown.

The application circuitry 1230 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 1240 and configured to execute instructions stored in the memory/storage 1240 to enable various applications and/or operating systems running on the system 1200.

The baseband circuitry 1220 may include circuitry such as, but not limited to, one or more single-core or multi-core processors. The processor(s) may include a baseband processor. The baseband circuitry 1220 may handle various radio control functions that enable communication with one or more radio networks via the RF circuitry 1210. The radio control functions may include, but are not limited to, signal modulation, encoding, decoding, radio frequency shifting, etc. In some embodiments, the baseband circuitry 1220 may provide for communication compatible with one or more radio technologies. For example, in some embodiments, the baseband circuitry 1220 may support communication with an E-UTRAN and/or other WMAN, a WLAN, or a WPAN. Embodiments in which the baseband circuitry 1220 is configured to support radio communications of more than one wireless protocol may be referred to as multi-mode baseband circuitry.

In various embodiments, baseband circuitry 1220 may include circuitry to operate with signals that are not strictly considered as being in a baseband frequency. For example, in some embodiments, baseband circuitry 1220 may include circuitry to operate with signals having an intermediate frequency, which is between a baseband frequency and a radio frequency.

In some embodiments, the processing circuitry 216 or 226 of FIG. 2 may be embodied in the application circuitry 1230 and/or the baseband circuitry 1220.

RF circuitry 1210 may enable communication with wireless networks using modulated electromagnetic radiation through a non-solid medium. In various embodiments, the RF circuitry 1210 may include switches, filters, amplifiers, etc., to facilitate the communication with the wireless network.

In various embodiments, RF circuitry 1210 may include circuitry to operate with signals that are not strictly considered as being in a radio frequency. For example, in some embodiments, RF circuitry 1210 may include circuitry to operate with signals having an intermediate frequency, which is between a baseband frequency and a radio frequency.

In some embodiments, the transceiver circuitry 214 or 224 of FIG. 2 may be embodied in the RF circuitry 1210.

In some embodiments, some or all of the constituent components of the baseband circuitry 1220, the application circuitry 1230, and/or the memory/storage 1240 may be implemented together on a system on a chip (SOC).

Memory/storage 1240 may be used to load and store data and/or instructions, for example, for system 1200. Memory/storage 1240 for one embodiment may include any combination of suitable volatile memory (e.g., dynamic random access memory (DRAM)) and/or non-volatile memory (e.g., flash memory).

In various embodiments, the I/O interface 1280 may include one or more user interfaces to enable user interaction with the system 1200 and/or peripheral component interfaces to enable peripheral component interaction with the system 1200. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 1270 may include one or more sensing devices to determine environmental conditions and/or location information related to the system 1200. In some embodiments, the sensors may include, but are not limited to, a gyro sensor, an accelerometer, a proximity sensor, an ambient light sensor, and a positioning unit. The positioning unit may also be part of, or interact with, the baseband circuitry 1220 and/or RF circuitry 1210 to communicate with components of a positioning network, e.g., a global positioning system (GPS) satellite.

In various embodiments, the display 1250 may include a display, e.g., a liquid crystal display, a touch screen display, etc. In some embodiments, the camera 1260 may include many molded plastic aspheric lens elements made with varying dispersion and refractive indexes. In some embodiments, the camera 1260 may include two or more lenses to capture three-dimensional images for stereo photography.

In various embodiments, the system 1200 may be a mobile computing device such as, but not limited to, a laptop computing device, a tablet computing device, a netbook, an ultrabook, a smartphone, etc. In various embodiments, system 1200 may have more or fewer components, and/or different architectures.

Figure 13:
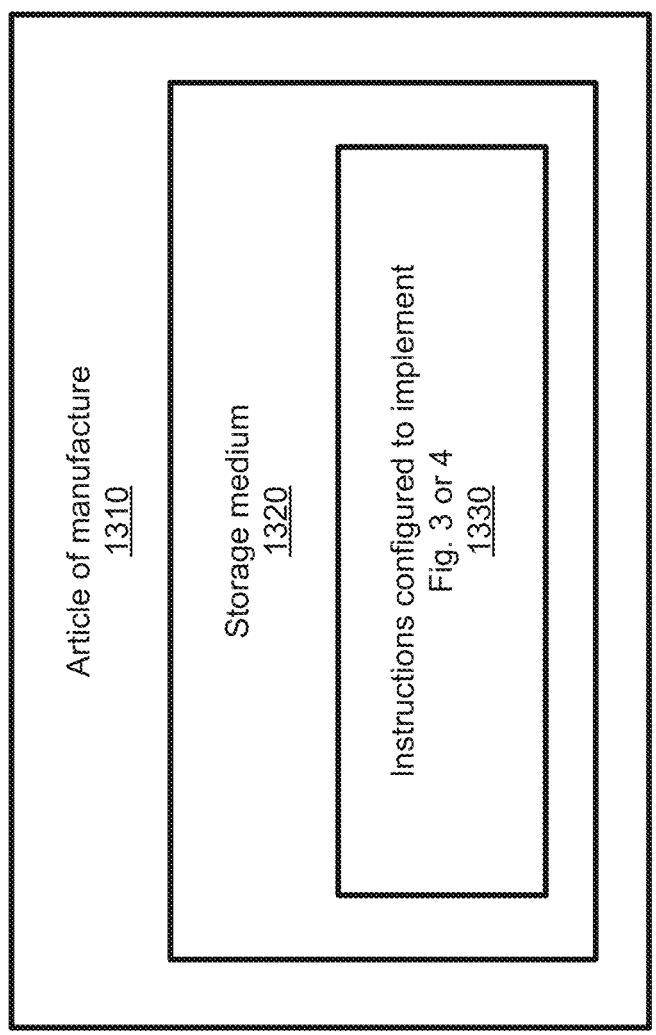
FIG. 13 illustrates an article of manufacture having programming instructions, incorporating aspects of the present disclosure, in accordance with various embodiments.

FIG. 13 illustrates an article of manufacture 1310 having programming instructions, incorporating aspects of the present disclosure, in accordance with various embodiments. In various embodiments, an article of manufacture may be employed to implement various embodiments of the present disclosure. As shown, the article of manufacture 1310 may include a computer-readable non-transitory storage medium 1320 where instructions 1330 are configured to practice embodiments of or aspects of embodiments of any one of the processes described herein. The storage medium 1320 may represent a broad range of persistent storage media known in the art, including but not limited to flash memory, dynamic random access memory, static random access memory, an optical disk, a magnetic disk, etc. In embodiments, computer-readable storage medium 1320 may include one or more computer-readable non-transitory storage media. In other embodiments, computer-readable storage medium 1320 may be transitory, such as signals, encoded with instructions 1330.

In various embodiments, instructions 1330 may enable an apparatus, in response to its execution by the apparatus, to perform various operations described herein. As an example, storage medium 1320 may include instructions 1330 configured to cause an apparatus, e.g., UE 210 in connection with FIG. 2, to practice some aspects of provisioning of guard intervals in a subframe, e.g., as illustrated in process 300 of FIG. 3, in accordance with embodiments of the present disclosure. As another example, storage medium 1320 may include instructions 1330 configured to cause an apparatus, e.g., UE 220 in connection with FIG. 2, to practice some aspects of provisioning of guard intervals in a subframe, e.g., as illustrated in process 400 of FIG. 4, in accordance with embodiments of the present disclosure.

The following paragraphs describe examples of various embodiments.

Example 1 is a user equipment (UE) including a radio transceiver to communicate with another UE via device-to-device (D2D) communications. The UE may further include processing circuitry, coupled to the radio transceiver, to generate a cyclic prefix (CP) for a first or second symbol of a D2D subframe at an orthogonal frequency division multiplexing (OFDM) resource block or a single-carrier frequency-division multiple access (SC-FDMA) resource block, wherein the CP has a length greater than 33.33 microseconds.

Example 2 includes the subject matter of example 1, wherein the processing circuitry is further to puncture a first half of a useful symbol length of the first symbol and/or a second half of a useful symbol length of a last symbol of the D2D subframe.

Example 3 includes the subject matter of example 1 or 2, wherein the processing circuitry does not puncture a last symbol of the D2D subframe unless the D2D subframe is followed by an uplink subframe.

Example 4 includes the subject matter of any one of examples 1-3, wherein the processing circuitry is to use a second half of a useful symbol length of the first symbol, generated based on a second half of a useful symbol length of the second symbol, as a part of the CP for the second symbol.

Example 5 includes the subject matter of example 4, wherein the processing circuitry is further to puncture an entirety of a last symbol of the D2D subframe, or to puncture a first half of the useful symbol length of the first symbol and a second half of a useful symbol length of the last symbol.

Example 6 includes the subject matter of any one of examples 1-5, wherein the processing circuitry is to use a first half of a useful symbol length of the first symbol, generated based on a second half of the useful symbol length of the first symbol, as a part of the CP for the first symbol.

Example 7 includes the subject matter of any one of examples 1-6, wherein the processing circuitry is to generate the CP having a length greater than 66.67 microseconds for the second symbol.

Example 8 is a user equipment (UE) including a radio transceiver to communicate with another UE via Long-Term Evolution (LTE) Proximity Services (ProSe) or LTE Direct. The UE may further include processing circuitry, coupled to the radio transceiver, to transmit a signal in a first symbol of a D2D subframe at an OFDM resource block or an SC-FDMA resource block, for AGC setting at a receiving UE.

Example 9 includes the subject matter of example 8, wherein the processing circuitry is further to generate a cyclic prefix to be greater than 66.67 microseconds for a second symbol of the D2D subframe.

Example 10 includes the subject matter of example 8 or 9, wherein the processing circuitry is to use a UL-DMRS as the signal in the first symbol, and wherein a base sequence and a cyclic shift of the UL-DMRS are the same as those used for respective UL-DMRS on a fourth symbol and an eleventh symbol of the subframe.

Example 11 includes the subject matter of example 10, wherein the processing circuitry is to use a first half of a useful symbol length of the first symbol, generated based on a second half of the useful symbol length of the first symbol, as a part of an cyclic prefix for the first symbol; and to keep the UL-DMRS at a second half of the useful symbol length of the first symbol.

Example 12 includes the subject matter of example 10, wherein the processing circuitry is to map the UL-DMRS to an entirety of a non-cyclic-prefix portion of the first symbol.

Example 13 includes the subject matter of example 8 or 9, wherein the processing circuitry is to use an AGC reference signal as the signal, wherein the AGC reference signal is a sequence that has a peak-to-average-power-ratio (PAPR) and is common to a plurality of transmitting UEs, and wherein the AGC reference signal is defined on a per-resource block or on a per-resource block set basis.

Example 14 includes the subject matter of example 8 or 9, wherein the processing circuitry is to transmit random Quadrature Phase Shift Keying (QPSK) symbols on the first symbol as the signal.

Example 15 includes the subject matter of any one of examples 8-14, wherein the processing circuitry is to puncture a first half of a useful symbol length of the first symbol.

Example 16 is a method for signal designs for D2D subframes. The method may include providing a first guard interval at a first symbol of a subframe to facilitate setting up AGC at a receiving UE; and providing a second guard interval at the subframe to facilitate transmit-to-receive or receive-to-transmit switching at the receiving UE.

Example 17 includes the subject matter of example 16, and further includes generating a CP for the first symbol of the subframe as the first guard interval, wherein the CP has a length greater than 33.33 microseconds.

Example 18 includes the subject matter of example 16, and further includes generating a CP for a second symbol of the subframe as the first guard interval, wherein the CP has a length greater than 66.67 microseconds.

Example 19 includes the subject matter of any one of examples 16-18, and further includes mapping random quadrature phase shift keying (QPSK) symbols to the resource elements (REs) of the first symbol.

Example 20 includes the subject matter of any one of examples 16-18, and further includes transmitting a signal in the first guard interval, and wherein the signal is a UL-DMRS or an AGC reference signal.

Example 21 includes the subject matter of examples 20, and further includes using a first half of a useful symbol length of the first symbol, generated based on a second half of the useful symbol length of the first symbol, as a part of a cyclic prefix for the first symbol; and mapping the UL-DMRS to a second half of the useful symbol length of the first symbol.

Example 22 includes the subject matter of examples 20, and further includes defining the AGC reference signal on a per-resource block or on a per-resource block set basis; and configuring a sequence that has a low peak-to-average-power-ratio (PAPR) and is common to a plurality of transmitting UEs, for the AGC reference signal.

Example 23 includes the subject matter of any one of examples 16-22, and further includes puncturing at least a part of a last symbol or the first symbol of the subframe as the second guard interval.

Example 24 is at least one storage medium having instructions configured to cause an apparatus, in response to execution of the instructions by the apparatus, to practice any subject matter of Examples 16-23.

Example 25 is an apparatus for wireless communication, which may include means to practice any subject matter of Examples 16-23.

Example 26 is a user equipment (UE) including a radio transceiver to communicate with another UE via device-to-device (D2D) communications; and processing circuitry, coupled to the radio transceiver, to schedule a D2D subframe to be transmitted at least 624 basic time units ahead of a corresponding reference time of the D2D subframe, wherein one basic time unit equals $\frac{1}{30720000}$ seconds.

Example 27 includes the subject matter of example 26, wherein the corresponding reference time is a serving or camping cell downlink reference time in a time division duplex deployment.

Example 28 includes the subject matter of example 26 or 27, wherein the processing circuitry is to schedule the D2D subframe to be transmitted at 624 basic time units ahead of a serving or camping cell downlink reference time in a time division duplex deployment.

Example 29 includes the subject matter of example 26, wherein the corresponding reference time is a serving cell uplink reference time (SCURT) in a time division duplex deployment, wherein SCURT=SCDRT−TA, wherein SCDRT is a serving cell downlink reference time, and TA is an active timing advance value.

Example 30 includes the subject matter of any one of examples 26-29, wherein the processing circuitry is further to puncture a last symbol of the D2D subframe.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. A user equipment (UE), comprising:
   one or more antennas; and
   communication circuitry, coupled with the one or more antennas, the communication circuitry to transmit, via at least one of the one or more antennas, a device-to-device (D2D) subframe to another UE at a Timing (T) ahead of a downlink reference time (T1) with a Timing Advance (TA), where T=(T1−TA) and the downlink reference time is associated with a serving cell provided by a base station with which the UE is communicatively coupled, and
   wherein the D2D subframe does not include a last data symbol of the subframe.

2. The UE of claim 1, wherein the Timing Advance (TA) is at least 624 basic time units, where one basic time unit equals to $\frac{1}{30720000}$ seconds.

3. The UE of claim 1, wherein the communication circuitry is to communicate with the other UE via a time division duplex (TDD) deployment.

4. The UE of claim 1, wherein the last data symbol not transmitted by the communication circuitry is a Single Carrier Frequency-Division Multiple Access (SC-FDMA) symbol.

5. The UE of claim 1, wherein the communication circuitry is to communicate with the other UE via D2D communication without involvement of the base station.

6. The UE of claim 1, wherein the communication circuitry is to receive a first value from the base station, and
   wherein a processing circuitry included in the UE is to determine the Timing Advance (TA) based on the first value.

7. The UE of claim 1, wherein the Timing Advance (TA) equals (N_TA+624)*basic time units (Ts), and
   wherein the N_TA is predetermined by the base station.

8. The UE of claim 7, wherein the UE is to schedule a switch from reception to transmission within a time period of the TA.

9. A user equipment (UE), comprising:
   one or more antennas; and
   communication circuitry, coupled with the one or more antennas, the communication circuitry to receive, via at least one of the one or more antennas, a device-to-device (D2D) subframe from another UE at a Timing (T) ahead of a downlink reference time (T1) with a Timing Advance (TA), where T=(T1−TA) and the downlink reference time is associated with a serving cell provided by a base station with which the UE is communicatively coupled, and
   wherein the D2D subframe does not include a last data symbol of the subframe.

10. The UE of claim 9, wherein the Timing Advance (TA) is at least 624 basic time units, where one basic time unit equals to $\frac{1}{30720000}$ seconds.

11. The UE of claim 9, wherein the communication circuitry is to communicate with the other UE via a time division duplex (TDD) deployment.

12. The UE of claim 9, wherein the last data symbol is a Single Carrier Frequency-Division Multiple Access (SC-FDMA) symbol.

13. The UE of claim 9, wherein the communication circuitry is to communicate with the other UE via D2D communication without involvement of the base station.

14. The UE of claim 9, wherein the Timing Advance (TA) equals (N_TA+624)*basic time units (Ts), and
    wherein the N_TA is predetermined by the base station.

15. The UE of claim 9, wherein the UE is to schedule a switch from reception to transmission within a time period of the TA.

16. A processor for a user equipment (UE), the processor comprising:
   circuitry configured to execute one or more instructions to perform operations comprising:
      communicating, via one or more antennas of the UE, a device-to-device (D2D) subframe from another UE at a Timing (T) ahead of a downlink reference time (T1) with a Timing Advance (TA), where T=(T1−TA) and the downlink reference time is associated with a serving cell provided by a base station with which the UE is communicatively coupled, and
      wherein the D2D subframe does not include a last data symbol of the subframe.

17. The processor of claim 16, wherein the Timing Advance (TA) is at least 624 basic time units, where one basic time unit equals to $\frac{1}{30720000}$ seconds.

18. The processor of claim 16, wherein the circuitry is to communicate with the other UE via a time division duplex (TDD) deployment, and
   wherein the last data symbol is a Single Carrier Frequency-Division Multiple Access (SC-FDMA) symbol.

19. The processor of claim 16, wherein the Timing Advance (TA) equals (N_TA+624)*basic time units (Ts), and
   wherein the N_TA is predetermined by the base station.

20. The processor of claim 16, wherein the processor is to schedule a switch from reception to transmission within a time period of the TA.

\* \* \* \* \*